Aug. 23, 1960     C. B. KREKELER ET AL     2,950,096
CUTTING BITS AND BIT HOLDERS

Filed June 19, 1958     2 Sheets-Sheet 1

INVENTORS.
CLAUDE B. KREKELER,
ARMIN O. BRUESTLE AND JOHN R. CARTLIDGE,
BY Allen & Allen

ATTORNEYS.

Aug. 23, 1960   C. B. KREKELER ET AL   2,950,096
CUTTING BITS AND BIT HOLDERS
Filed June 19, 1958   2 Sheets-Sheet 2

INVENTORS.
CLAUDE B. KREKELER,
ARMIN O. BRUESTLE AND JOHN R. CARTLIDGE,
BY Allen & Allen
ATTORNEYS.

United States Patent Office 2,950,096
Patented Aug. 23, 1960

2,950,096

CUTTING BITS AND BIT HOLDERS

Claude B. Krekeler, Monfort Heights, Armin O. Bruestle, Cincinnati, and John R. Cartlidge, Bridgetown, Ohio, assignors to The Cincinnati Mine Machinery Co., Cincinnati, Ohio, a corporation of Ohio Filed June 19, 1958, Ser. No. 743,195

15 Claims. (Cl. 262—33)

The invention has to do with mining machinery. Such machinery may take various forms. For example, in one type of mining machine, a cutter chain is driven around the periphery of an elongated cutter bar mounted at the front end of the machine. The chain has links presenting "blocks" or socket members which either directly engage cutter bits or which engage holders for supporting cutter bits. Such a machine is frequently used for undercutting a seam of coal, after which the coal is blown down by explosives. In another type of mining machine a plurality of driven cutter chains together with cutter heads are mounted on a shaft. Machines of this type are frequently employed to cut coal and deliver it to a conveying mechanism. Still other types of mining machinery employ rotative cutter heads alone. The invention is applicable to all of these types, there being either on the chains or on the cutter heads or both, blocks or socket members having the functions referred to above.

The bits which are employed in mining machinery range from forged structures having heads and shanks which are engaged in the blocks, and which are quite expensive to manufacture, to replaceable bits, usually double-ended, which are engaged either in the blocks or in bit holders which coact with the socket members. Replaceable, double-ended cutter bits, in turn, range from heavy-mass steel structures of substantially rectangular cross section, usually 4 to 6 inches in length and having transverse dimensions of ¾ inch or more, the ends being pointed or otherwise configured for cutting purposes, to lighter and cheaper structures which are formed by cutting rolled steel rod stock along planes lying at a substantial angle to the major axis of the rod stock. The angular cuts (normally made by sawing or with a cutting wheel) may lie alternately at opposite angularities to the major axis of the rod stock, providing bits which are trapezoidal in side elevation (see Stenger et al. Patent No. 2,039,747), or they may be made in parallel planes, providing bits which are rhomboidal in side elevation. The rod stock is normally rolled to a contour which will provide a cutting end or "point" at each end of the bit. A generally diamond shaped cross section for the rolled rod stock is most frequent, although other cross sectional shapes have been suggested.

The invention pertains to such rhomboidal cutter bits; and a principal object of the invention is the provision of means whereby a substantial savings may be made in the use of replaceable, throw-away bits of this type.

It is an object of the invention to provide an apparatus assembly wherein rhomboidal bits may be used for heavy duty cutting, the bits being lighter, or smaller, or cheaper to manufacture, all as will hereinafter be explained.

It is an object of the invention to provide a new type of rhomboidal bit which is smaller, lighter in mass, and cheaper to produce than those hitherto current in the art.

These and other objects of the invention which will be set forth hereinafter or will be apparent to one skilled in the art upon reading these specifications, are accomplished in that construction and arrangement of parts of which certain exemplary embodiments will now be described. Reference is made to the drawings accompanying these specifications, in which.

Figure 8:
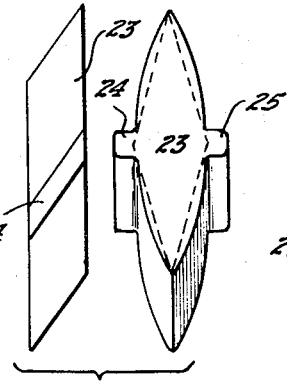

Figure 8 includes a side elevation and a face view of another form of the bit of this invention.

Figure 9:
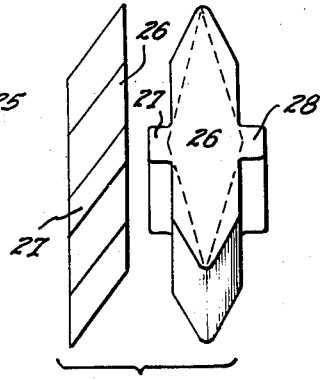

Figure 9 includes a side elevation and a face view of yet another form of the bit of this invention.

Figure 10:
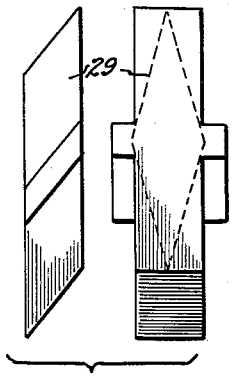

Figure 10 includes a side elevation and a face view of yet another form of the bit of this invention.

Figure 11:
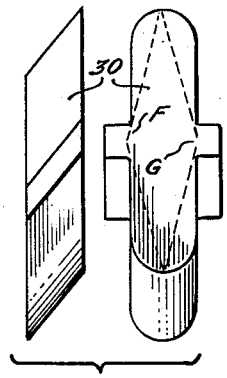
Figure 12:
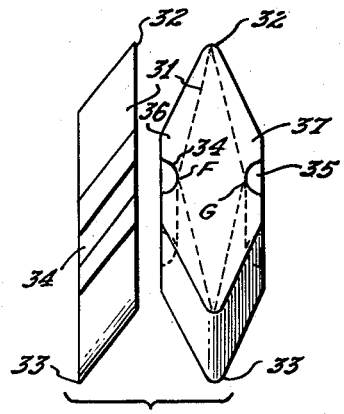

Figures 11 and 12 illustrate still other bit forms.

Figure 13:
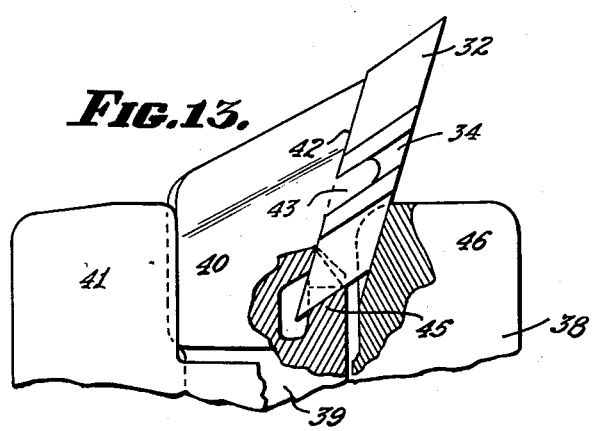

Figure 13 is a side elevation of a form of block structure including a bit holder and the bit of Figure 12, parts being shown in section.

Figure 14:
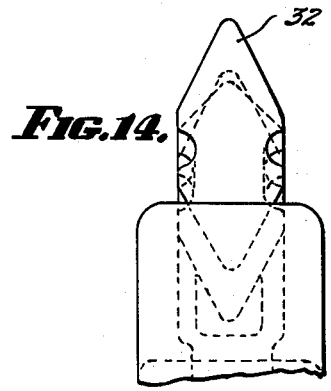

Figure 14 is a front elevation of the same structure.

Figure 15:
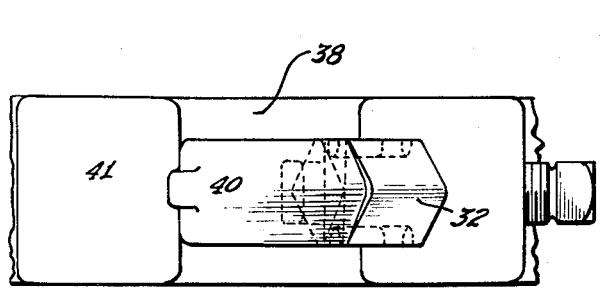

Figure 15 is a top plan view of the same structure.

Figure 16:
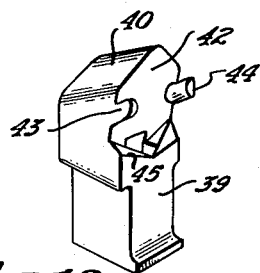

Figure 16 is a perspective view of the bit holder used in the structures of Figures 13 to 15.

Rhomboidal double-ended bits are normally used with bit holders, although in some instances they may be engaged directly in the socket members of mining machinery cutting heads or chains. The cutting strains are of course rearwardly and downwardly (or away from the cutting point which is in use). The bits therefore are normally bottomed either in the socket member or in a bit holder having a head and a shank. In still other constructions the bit is bottomed on an anvil member detachably secured to the socket member. Where bit holders are used, they act to transmit the rearward cutting strains to the socket members, either through the bit holder shanks or through the bit holder heads which may lie against an abutment on the block or socket member.

But the replaceable bits also have to be held against outward dislodgement from the socket member or bit holder. In some structures this is accomplished primarily by a frictional clamping engagement of members against the forward and rearward faces of the bits. Such engagement to be effective usually requires bits of considerable length. In other structures engagement of the bit in a recess in the head of the bit holder is relied upon to prevent outward dislodgement. This means either that some portions of the bit holder head must engage tapering side portions of the bit above the bit midsection, or that some portion of the bit holder head must engage above the top edge of the bit, or both. In either event, a fairly large bit size is dictated in order that there may be a sufficient projection of the cutting point of the bit beyond any parts of the bit holder head or socket member which engage the bit. If this is not done, exposed portions of the bit holder head or socket member will be worn away or "cored" by engagement with the material being cut. Coring not only diminishes the stability of the cutting device, but also may proceed in some structures to such an extent that the bit holder or socket member will no longer be able to engage the bit in such a way as to prevent endwise withdrawal. Since bit holders are relatively expensive forged structures, it is evident that a bit holder should outlast many bits.

While it is not uncommon to have some portion of the bit holder or socket member extend upwardly behind some portion of the rear face of the bit to serve as a strain-absorbing backing, the bits have usually required for stability a very substantial front-to-rear dimension.

These considerations have in the past led to the use of relatively large and massive cutter bits. Where rhomboidal bits are formed from rod stock of generally diamond-shaped cross section, the smallest of such bits designed for heavy duty work have been of the order of 3 inches or more in length, and have had a front face to rear face thickness of at least about 5/8 inch and have frequently been about 7/16 inch to 1/2 inch in width at their midsection. Many bits have been longer, with widths and thicknesses in proportion. Where other than diamond-shaped cross sections have been employed, the tendency has been toward narrower structures having a lessened ratio of width to thickness, and, for the most part, greater front face to rear face thickness.

In accordance with the present invention, it has been found possible to effect substantial savings in the provision of rhomboidal, double-ended cutter bits providing a new combination of dimensional relationships is observed. This new combination of dimensional relationships, which permits the manufacture of a wide variety of overall sizes of bits, may be expressed as follows:

(a) The face length of the bit should be from 70% to 95% of the overall bit length.

(b) The thickness of the bit should be from 10% to 30% of the overall bit length.

(c) The width of the bit should be greater than its thickness, i.e. the width:thickness ratio should be greater than unity.

When bits are constructed in accordance with this combination of dimensional relationships and are used in bit holders of the characteristics hereinafter set forth, it becomes possible to produce bits of the same overall length which have substantially less thickness, whereby a savings in metal is attained. More importantly, it becomes possible to make bits capable of performing the same heavy duty service, which bits are substantially less in both thickness and length. The terms used herein will now be defined.

Figure 7:
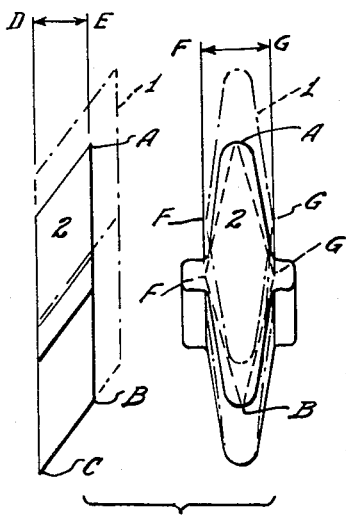
Figure 7 is a composite illustration in which a bit of this invention is compared with a typical prior art bit.

Referring first to Figure 7, a bit of this invention is contrasted with a typical prior art rhomboidal bit of generally diamond-shaped cross section. The prior art structure is illustrated in dotted lines at 1 while the typical bit of this invention is indicated in solid lines. To illustrate the respective dimensional relationships, it may be stated that structures 1 and 2 in Figure 7 were drawn proportionately to the following dimensions:

|  | Face Length, inches | Overall Length, inches | Face Width At Center, inches | Face To Face Thickness, inches |
|---|---|---|---|---|
| Bit 1 | 2 1/4 | 3 1/8 | 9/16 | 5/8 |
| Bit 2 | 2 1/8 | 2 7/16 | 9/16 | 7/16 |

The "face length" of the bits is the distance A—B. The "overall length" or length of the bits is the distance A—C measured along the diagonal of the rhombus. The "thickness" of the bits is the distance between the parallel but staggered bit faces measured in a direction normal to the faces, and is indicated in the figures as the distance D—E. The bits of this invention are frequently provided with ribs or other configuration at the midsections of the bit faces. These ribs or other configurations do not substantially change the effective width of the bits; and the bit "width" (which is measured at the midsections of the bit faces) is most accurately defined as the width of the largest diamond-shaped figure or parallelogram which can be inscribed in the areas of the bit faces. This is illustrated in dotted lines, the bit width being the distance F—G.

The bits contrasted in Figure 7 were cut with the same angularity from rod stock. The combination of dimensional relationships set forth above establishes a range of angularities within which to operate. A variation of the angularity of the planes of cut to the major axis of the rod stock will produce variation in the face length and overall bit length as will be readily understood by the skilled worker in the art. It is preferable to hold the angularity of the planes of cut to between about 30° and 45° in heavy duty bits, the planes of cut being parallel with each other, of course.

It will be noted that the bit 2 in Figure 7 is not only both shorter and thinner than bit 1, but also that it is cut from rod stock having a lesser side to side dimension.

The bit dimensions indicated in the table above are illustrative but not limiting.

The reasons why the dimensional relationships set forth above enable substantial savings to be made in the provision of rhomboidal cutting bits may be explained as follows:

Assume that the "cutting portion" of a rhomboidal bit is that portion which extends from the midsection of the forward face to the cutting end on that face, since this is primarily the portion which will come into contact with uncut material, as in the cutting of coal.

If the "cutting portion" is long and narrow, it may lack stability against lateral forces encountered in the cutting operation. Stability can be contributed to such a bit only in two ways, either the bit must be made thicker in the face-to-face direction, or some kind of a holder must be employed which will give side support to the cutting portion of the bit, or both. Bits have hitherto been employed in holders which give side support to the cutting portion; but this is undesirable because the holder thus becomes subject to "coring"; and, because the holders wear out more quickly, a considerable part of the economy inherent in the use of replaceable bits tends to be lost.

As indicated, savings are effected in the bits of this invention (in one aspect) by making them thinner in the face-to-face direction than the heavy-duty bits hitherto known. It has not been possible to make substantial reductions in the thickness of prior art bits, since if this were done, the bits would no longer be adapted to heavy-duty service. In accordance with the present invention, however, long and narrow cutting portions on the bits are in part avoided by proportioning the face length to the overall length, item (a) above, by proportioning the thickness to the overall bit length, item (b) above, and by increasing the width of the bit to a value greater than its thickness, item (c) above. These factors coact with a fourth factor to permit the use of bits which are both shorter and thinner than those which could be used for comparable heavy-duty cutting in the past. The fourth factor may be stated as follows:

(d) Lines representing the contour of the bit face should lie wholly outside imaginary lines representing the largest diamond-shaped figure which could be inscribed in the bit face, as set forth above. This contributes greater lateral rigidity to the cutting portion of the bit in proportion to its length than it would have otherwise.

In view of the combination of these factors, it becomes possible to compensate for a diminished face-to-face thickness by providing backing for the bit on a bit holder or block. The bit should be backed substantially throughout the area of the rear or trailing face, and, of course, it will be bottomed on the bit holder, the block, or an anvil member so as to withstand the downward stresses of cutting. The bit will be held against lateral displacement by means on the holder or associated devices essentially engaging the bit below the "cutting portion" as above defined. However, the bit must also be held in the bit holder or bit engaging means in such a way as to prevent endwise withdrawal. This is accomplished by the provision of some means on the holding device which will engage laterally over a portion of the bit at or adjacent the midsection of its rear or trailing face, which portion extends laterally beyond the said engaging means.

In order to prevent coring, when the bit is located and held in cutting position, the laterally engaging portions of the bit holder should, in the direction of cutting, be located substantially wholly behind the same or a corresponding laterally extending portion of the front or leading face of the bit.

While it is possible to attain this effect with bits which are generally diamond-shape in cross section or in face shape, providing the bit is not too small in absolute dimensions, it is more conveniently and effectively attained by providing ribs at or enlargements adjacent the midsections of the faces, as hereinafter explained. Thus, a fifth factor may be stated as follows:

(e) The bit should preferably have, at or adjacent its midsection, a projection extending beyond the width of the bit as hereinabove defined.

The provision of the "projection" permits the more effective use of hold-down means of adequate mass, which are protected from coring because the projection cuts or breaks away the coal or other material before it reaches the hold-down means. The backing means extending above the hold-down means is of course, located wholly behind the cutting portion of the bit and is thus protected from coring.

Some of the above noted factors are not themselves new; but the combination of factors as herein set forth has not hitherto been employed to permit the use of renewable cutter bits which are lighter, smaller and less expensive than those which have thus far been found necessary in heavy-duty cutting.

It will be evident that the absolute dimensions of the bits of this invention may be varied so long as the noted relationships are observed. In order, however, to give specific examples of the dimensions of heavy-duty bits which have been found satisfactory in the cutting of coal, the following is given:

|  | Inches |
|---|---|
| Bit length as measured from cutting point to cutting point | 2 to 3 |
| Face length | 1⅞–2⅜ |
| Thickness as measured from front face to rear face | 5/16–9/16 |
| Width at midsection (as defined) | 7/16–7/8 |

These dimensions are illustrative, and serve to indicate preferred ranges. It will be noted that the actual cutting portions of these bits are fairly short, being from about ⅞ to 1⅛ inches in length. The thickness of the bits is small, varying from about 5/16 to 9/16 inch for bits having from 2 to 3 inches overall length. The ratio of length of cutting portion to thickness is about 3:1 to about 1:1. The ratio of length of cutting portion to width is about 2:1 to about 3:1. The ratio of width to thickness is about 7:5 to about 14:5, and in any event greater than unity. The width may be increased without increasing the other dimensions if desired.

Figures 3, 4:
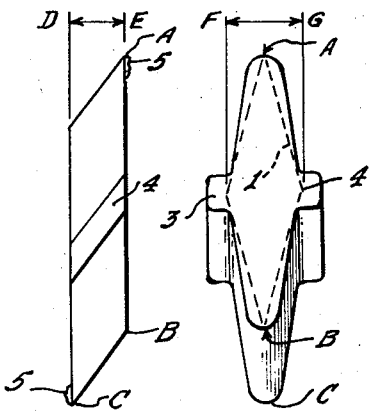
Figures 3 and 4 are respectively a side elevation and a face view of one form of the rhomboidal bit of this invention.

A type of bit which may be used in the present invention is illustrated in Figures 3 and 4. This bit was made from contour-rolled steel rod, 1⅜ inches from side to side, by slantwise cuts as described above. The length of the bit face from the cutting point A to the opposite end B of the face is only about 2 inches. The face-to-face thickness of the bit of this exemplary embodiment, i.e. the distance D—E is 7/16 inch. The rod stock was rolled with relatively massive longitudinal ribs 3 and 4. The width of the bit at its midsection as defined above, i.e. the distance F—G, is about 9/16 inch, and thus is greater than the thickness. The cutting points of the bit, as determined by the contour of the roller stock, are relatively wide and rounded; but it will be seen that the lines representing the contour of the cutting portion of the bit lie outside the lines representing the largest inscribable diamond-shaped figure. The overall length of the bit, i.e. the distance from cutting point to cutting point, is about 2¼ inches.

If such a bit were merely engaged in a block or bit holder at and below its midsection, the thickness of the bit (7/16 inch in the exemplary embodiment) would not be sufficient to withstand the stresses of heavy-duty cutting without excessive breakage. The bit can be backed by means on the bit holder or block so that the rearward stresses of cutting can be transferred to the block without substantial flexing of the cutter bit.

The cutting point of the exemplary bit of this invention projects beyond the midsection of the bit face on which it is located only a distance of about one inch. This diminished projection in itself effectively strengthens the backing effect.

The width of the bit at its midsection is great enough to give stability. In the exemplary embodiment, the distance F—G is 9/16 inch at the least, and is greater than the thickness D—E of the bit. This gives a broad base to the bit such that if the bit is adequately supported at its midsection, it cannot tilt or come out of alignment with the backing means.

The means provided to hold the bit against outward displacement are preferably located on the backing means whether this be a part of a bit holder or of a block. The relatively massive ribs 3 and 4 of the bit shown in Figures 3 and 4 may be employed as abutments above which some portion of the bit holder may engage. In use these ribs will be disposed aslant to the horizontal, and since the outward displacing forces are not large, hold-down means of relatively small vertical depth may be located behind the front edges of the ribs in the direction of cutting so as to prevent coring. The lateral width of the ribs permits these hold-down means to have adequate lateral dimensions. This also permits the use of bits in which the distance from the midsection of the front face to the cutting end is quite short.

The bits also have to be bottomed so as to withstand the downward component of the cutting stresses. This may be accomplished in various ways as hereinafter set forth, but is most conveniently accomplished when using the bit of Figures 3 and 4 by bottoming the bit on the undersides of the ribs.

The individual bits having been cut from contour-rolled steel rod stock are hardened in an appropriate heat treatment. If desired the cutting points of the bits may be reinforced with inserts or deposits of hard alloy such as tungsten carbide or Carboloy as indicated at 5 in Figure 3. The protrusion of the reinforcements is not included in the measurement of the bit thickness D—E.

Figure 1:
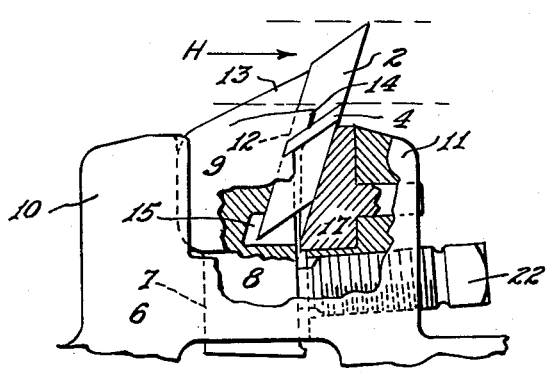
Figure 1 is a side elevation of one form of block structure, including a bit holder and a rhomboidal bit, parts being shown in section.

Turning now to Figure 1, a block or socket member is indicated at 6. It has a perforation 7 to receive the shank 8 of a bit holder having a head 9. The socket member or block has upward extensions 10 and 11 at its front and rear ends. The head 9 rests against the extension 10 so as to transfer at least a part of the rearward stresses of cutting to it.

Figure 2:
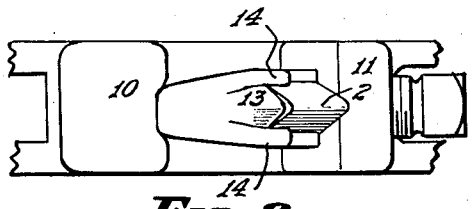
Figure 2 is a top plan view of the same structure.

The head of the bit holder is provided with a surface 12 engaging the rear face of the bit 2 so as to back the bit. The head is brought upwardly behind the bit as at 13 so as to continue the backing action substantially throughout the length of the upper portion of the rear face of the bit; but the portion 13 is confined to a position wholly behind the bit to avoid coring. The head has, however, projections 14 of relatively minor size engaging above the ribs 3 and 4 so as to hold the bit down. In the cutting operation the bit will be traveling in the direction indicated by the arrow H, and it will be observed that the projections 14 lie wholly behind the front edges of the ribs 3 and 4. Figure 2 indicates that the projections 14 do not extend laterally beyond the outer ends of the ribs 3 and 4. The front edges of the ribs 3 and 4 are cutting edges which tend to cut or break away any coal or other material which might otherwise contact and erode or core the projections 14.

Figures 5, 6:
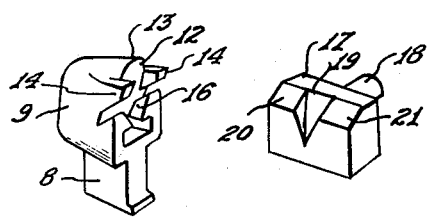
Figure 5 is a perspective view of a bit holder.
Figure 6 is a perspective view of an anvil member.

The bit holder is shown in perspective in Figure 5. In the particular embodiment the head is cut away at the lower end of the surface 12 as indicated at 15 to avoid contact with the lower cutting end of the bit. Side portions 16 of the bit holder may be configured to provide bottoming for the bit; but it is preferred to bottom the bit by means of the ribs 3 and 4 on abutments which are part of or which are attached to the socket member. A separable and renewable anvil member 17, illustrated in perspective in Figure 6, is preferably employed. This anvil member lies against the forward extension 11 of the socket member where it may be held in place by a dowel-like projection 18 which enters a hole in the extension 11. The anvil member may have a recess 19 to accept a portion of the lower end of the cutting bit, and providing a surface, between which and the surface 12, the bit may be clamped. The anvil member has, however, abutment surfaces 20 and 21 which engage beneath the ribs 3 and 4 and provide the main bottoming for the bit. The shank 8 of the bit holder may be held in the perforation 7 of the socket member by any suitable means such as the set screw 22, or by resilient means such as are shown in the copending applications in the name of one of the inventors of the present case, Claude B. Krekeler, Serial No. 659,562, filed May 16, 1957, and entitled, Cutter Bit and Socket Structures, and Serial No. 728,476, filed April 14, 1958, and entitled, Bits and Holding Means Therefor.

Figures 1, 2, 5 and 6 illustrate one mode of use of the bit structure of Figures 3 and 4. A positive cutting action is provided with adequate stability despite the small size of the bit and the diminished face-to-face thickness thereof. Adequate backing for a thin bit is provided. At the same time the bit holder is protected from erosion and coring despite the relative shortness of the bit projection. The skilled worker in the art will, of course, understand that in cutter chains the bits and bit holders in successive links are set at different angularities in accordance with a predetermined pattern, so that a width of cut is attained such as will pass the cutter bar and cutter chain.

Figures 8, 9, 10 and 11 show other forms of cutter bits all of which respond to the considerations set forth above. The bit 23 of Figure 8 is provided with ribs 24 and 25 like those hitherto described; and the bit differs chiefly from the bit of Figures 3 and 4 in that the contours of the upper and lower portions of the face follow outwardly convex lines to a relatively sharper cutting point, which may be desirable in certain types of work.

Figure 9 shows a bit 26 having ribs 27 and 28 at its midsection. The side edges of the upper and lower face portions follow parallel lines for a distance above and below the ribs, the bit ends therebeyond tapering rather abruptly to a cutting point. This bit has even greater lateral stability for a given thickness.

Figure 10 shows a bit 29 having lateral ribs at the midsection, the bit otherwise being rectangular in front elevation, providing chisel-like cutting points of substantial width. A somewhat similar construction is illustrated at 30 in Figure 11, excepting that the cutting ends, although of substantially the full width F—G, are rounded as indicated.

Yet another form of bit is illustrated at 31 in Figure 12. This bit like all of the others described herein is adapted to be made by cutting a contour-rolled steel rod stock along planes at an angle to the major axis of the stock. This bit is characterized by cutting points 32 and 33. At the midsection of the bit, instead of the relatively massive protruding ribs hereinabove described, there are rolled grooves 34 and 35. In this bit the width F—G of the bit is measured between the grooves. But it will be noted that as to each face of the bit of Figure 12 the side edge portions 36 and 37 extend outwardly beyond the points F—G by a distance equivalent to the depth of the grooves.

This makes it possible to employ a bit holder having a head portion lying wholly behind the upper portion of the bit excepting for finger-like elements which lie within the bit grooves. The laterally projecting portions 36 and 37 of the bit cut or break away coal or other material which could otherwise core any part of the bit holder head including the finger-like elements.

A mode of using the bit of Figure 12 is illustrated in Figures 13 to 16. Here a socket member is shown at 38, perforated to receive the shank 39 of a bit holder having a head 40.

As has been indicated, the head 40 lies wholly behind the bit 32 but is shaped to back it substantially throughout the length of the rear face of the bit. The head abuts against a rear upward projection 41 of the socket member; and it has a front face 42 coinciding with the rear face of the bit. Extending forwardly from the face 42 there are two finger-like extensions 43 and 44 shaped to enter the grooves 34 and 35 so as to prevent endwise withdrawal of the bit. The bit may have its lower edge bottomed at least in part on an abutment portion 45 of the bit holder. It also may be bottomed in part or wholly on a forward upward extension 46 of the socket member or upon an anvil member engaged therewith.

The bits of this invention are short in length and are characterized by a front face to rear face thickness which is less than the effective width of the bit at its midsection. All of them are capable of being made cheaply by cutting contour-rolled steel rod stock. The savings involved in the use of the bits of this invention are made possible by the proportionalities set forth above, the fact that the bits have adjacent their midsections means for cutting or breaking away materials which otherwise would core the bit holders, and the use of bit holders which back the bits substantially throughout the areas of their rear faces. While certain forms of bit holders have been illustrated herein it will be understood that modified forms may be employed within the purview of the invention, and that means for holding and backing the bits may be made as integral parts of block members.

Modifications may be made in the invention without departing from the spirit thereof. The invention having been described in certain exemplary embodiments, what is claimed as new and desired to be secured by Letters Patent is:

1. A cutter bit of the type which may be formed by cutting a contour-rolled steel rod stock along a plurality of parallel planes at less than a right angle to the axis of the rod stock, said bit being rhomboidal in side elevation and having opposite staggered faces each terminating in a cutting end, said bit being adapted to be engaged and moved in a cutting direction generally transverse to said faces, said bit having a face length of substantially 70% to 95% of its overall length as measured from cutting end to cutting end, a thickness as measured from face to face along a line normal to the faces of substantially 10% to 30% of its overall length, and a width to thickness ratio greater than unity, where the width is the width of the largest diamond-shaped figure which can be inscribed within said faces, in which bit the lines representing the contour of said bit faces lie outside said diamond-shaped figure, said bit having in the area of the midsection of its faces a lateral projection extending beyond the width of said bit as defined.

2. In combination in a mining machine, a cutter bit as claimed in claim 1 and a means for holding and backing said bit during a cutting operation, said means having a backing surface corresponding to substantially the entire area of the rear face of said bit at least above its midsection, any portion of said backing surface extending upwardly beyond the midsection of the front face of said bit being located wholly behind the cutting length of said front face extending from said midsection to the cutting end on said front face, said means having an element projecting forwardly and engaging above the projection of said bit, said means having means for bottoming said bit and means for holding said bit against said surface, said last mentioned means being located wholly below the said cutting length of said bit.

3. The cutter bit of claim 1 wherein the overall length of said bit is substantially 2 to 3 inches.

4. The cutter bit of claim 3 wherein the thickness of said bit is substantially 5/16 to 9/16 inch.

5. The cutter bit of claim 4 wherein the width of said bit as defined is substantially 7/16 to 7/8 inch.

6. The structure claimed in claim 5 having lateral ribs interconnecting the midsections of said opposed faces.

7. The structure claimed in claim 5 characterized by a groove connecting the midsection of said opposed faces, each of said faces having in the area of its midsection and adjacent said groove a projection extending beyond the width of said bit as defined.

8. The structure claimed in claim 3 wherein said projection is a laterally extending rib formed on the said bit and extending from the midsection of one face to the midsection of the other face.

9. A cutter bit of the type which may be formed by cutting a contour-rolled steel rod stock along a plurality of parallel planes at less than a right angle to the axis of the rod stock, said bit being rhomboidal in side elevation and having opposite staggered faces each terminating in a cutting end, said bit being adapted to be engaged and moved in a cutting direction generally transverse to said faces, said bit having a ratio of length of cutting portion to thickness of about 3:1 to about 1:1, a ratio of length of cutting portion to width of about 2:1 to about 3:1 and a ratio of width to thickness greater than unity, where the length of the cutting portion of said bit is the distance from the midsection of a face of said bit to the cutting point on said face, where the thickness of said bit is the distance between the faces of said bit as measured along a line normal to said faces, and where the width of said bit is the width of the largest diamond-shaped figure which can be inscribed within said faces, said bit having in the area of the midsection of its faces a lateral projection extending beyond the width of said bit as defined.

10. The structure claimed in claim 9 in which the width to thickness ratio is substantially 7:5 to 14:5.

11. The structure claimed in claim 10 wherein the overall length of the bit as measured from cutting point to cutting point is substantially 2 to 3 inches.

12. The structure claimed in claim 11 having lateral ribs interconnecting the midsections of the said opposed faces.

13. In combination a bit as claimed in claim 9, a bit holder having a head and a shank, said head having a backing surface engaging the rear face of said bit and hold-down means engaging above said projection, all portions of said bit holder head disposed rearwardly in the direction of cutting and lying behind the cutting length of said bit as measured from the midsection of the front face to its cutting end lying wholly within a rearward projection of the contour of the said cutting length, a socket member having a perforation to receive the shank of said cutter bit holder, means for holding the shank of said cutter bit holder in said perforation, and means on said socket member engaging the ribs of said cutter bit from beneath whereby to bottom said bit.

14. In combination, a cutter bit of the type which may be formed by cutting a contour-rolled steel rod stock along a plurality of planes at less than a right angle to the axis of the rod stock, said bit being rhomboidal in side elevation and having opposite staggered faces each terminating in a cutting end, said bit being adapted to be engaged and moved in a cutting direction generally transverse to said faces, said bit having a face length of substantially 70% to 95% of its overall length as measured from cutting end to cutting end, a thickness as measured from face to face along a line normal to the faces of substantially 10% to 30% of its overall length, and a width to thickness ratio greater than unity, where the width is the width of the largest diamond-shaped figure which can be inscribed within the said faces, in which bit the lines representing the contour of said bit faces lie outside said diamond-shaped figure, and holding means for said bit comprising means presenting a backing surface to substantially the entire area of the rear face of said bit, any portion of said last mentioned means extending upwardly of a line intersecting the midsection of the front face of said bit and extending in the said cutting direction being located wholly behind the portion of said front face lying above said midsection, means for bottoming said bit, and means lying below said midsection for holding said bit against said backing surface.

15. The structure claimed in claim 14 wherein said bit is substantially 2 to 3 inches in overall length.

References Cited in the file of this patent

UNITED STATES PATENTS

| | | |
|---|---|---|
| 2,765,158 | Moehlmann | Oct. 2, 1956 |
| 2,791,413 | Bruestle et al. | May 7, 1957 |
| 2,791,414 | Bruestle et al. | May 7, 1957 |